(12) United States Patent
Hirabayashi et al.

(10) Patent No.: US 7,280,310 B2
(45) Date of Patent: Oct. 9, 2007

(54) MAGNETIC RECORDING AND REPRODUCTION APPARATUS

(75) Inventors: Koichiro Hirabayashi, Osaka (JP); Hiroshi Kurumatani, Hyogo (JP); Toshiaki Ueta, Tokushima (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 427 days.

(21) Appl. No.: 10/816,760

(22) Filed: Apr. 2, 2004

(65) Prior Publication Data
US 2004/0233571 A1 Nov. 25, 2004

(30) Foreign Application Priority Data
Apr. 4, 2003 (JP) ............... 2003-101255

(51) Int. Cl.
*G11B 15/675* (2006.01)
*G11B 5/027* (2006.01)
(52) U.S. Cl. ............... 360/85; 360/95; 360/93; 360/90
(58) Field of Classification Search ............ 360/85, 360/81, 83, 84, 90, 93, 95, 96.5
See application file for complete search history.

(56) References Cited
U.S. PATENT DOCUMENTS
5,081,549 A * 1/1992 Doutsubo ............... 360/74.1
5,390,055 A * 2/1995 Maehara et al. ............ 360/85
5,621,589 A * 4/1997 Noriyuki et al. .......... 360/96.5
5,754,360 A * 5/1998 Lee et al. .................. 360/85
5,825,583 A * 10/1998 Kang et al. ................ 360/85

FOREIGN PATENT DOCUMENTS
JP 63214956 A * 9/1988

OTHER PUBLICATIONS
Translation of JP 63-214956.*

\* cited by examiner

*Primary Examiner*—Wayne Young
*Assistant Examiner*—Matthew G. Kayrish
(74) *Attorney, Agent, or Firm*—Renner, Otto, Boisselle & Sklar, LLP

(57) ABSTRACT

A magnetic recording and reproduction apparatus includes a main chassis on which a rotatable head cylinder is mounted; a sub chassis movable relative to the main chassis; a cassette holder for holding the cassette and mounting the cassette on the sub chassis; a cassette holder elevating section for moving the cassette holder up and down with respect to the sub chassis; a holder engaging section provided on the main chassis; and a main chassis engaging section provided on the cassette holder. The sub chassis is movable relative to the main chassis from a cassette mountable position at which the cassette is mountable on the sub chassis to a tape pull-out position at which the magnetic tape has been pulled out from the cassette and wound around the rotatable head cylinder. The holder engaging section and the main chassis engaging section are engaged with each other at the tape pull-out position.

2 Claims, 17 Drawing Sheets

(a) (b) (c)

(a) (b) (c)

MAGNETIC RECORDING AND REPRODUCTION APPARATUS

This non-provisional application claims priority under 35 U.S.C., §119(a), on Patent Application No. 2003-101255 filed in Japan on Apr. 4, 2003, the entire contents of which are hereby incorporated by reference.

BACKGROUND OF THE INVENTION

1. Field of the Invention

The present invention relates to a magnetic recording and reproduction apparatus, and in particular to a magnetic recording and reproduction apparatus in which a sub chassis is movable relative to a main chassis.

2. Description of the Related Art

A magnetic recording and reproduction apparatus includes two chassis, i.e., a main chassis and a sub chassis, for recording information to, and/or reproducing information from, a magnetic tape accommodated in a cassette.

With reference to FIGS. 11, 12, 13, 14, 15, 16 and 17, a conventional magnetic recording and reproduction apparatus 600 will be described.

FIG. 11 shows a main chassis 400 of a conventional magnetic recording and reproduction apparatus 600. Part (a) of FIG. 11 is a left side view of the main chassis 400, and part (b) of FIG. 11 is a plan view thereof.

The following elements are provided on the main chassis 400: a rotatable head cylinder 402 for recording information to, and/or reproducing information from, a magnetic tape, a first projection guide section 404 projecting upward from the main chassis 400, and a second projection guide section 406 projecting upward from the main chassis 400.

In FIG. 11, the elements other than the rotatable head cylinder 402, the first projection guide section 404 and the second projection guide section 406 are omitted for the sake of simplicity.

FIG. 12 shows a sub chassis 500 of the conventional magnetic recording and reproduction apparatus 600. Part (a) of FIG. 12 is a left side view of the sub chassis 500, part (b) is a plan view thereof, and part (c) is a right side view thereof.

The following elements are provided on the sub chassis 500: a lock engaging section 502, a first guide groove 504, and a second guide groove 506. The lock engaging section 502 is provided at a right end of the sub chassis 500.

In FIG. 12, the elements other than the lock engaging section 502, the first guide groove 504, and the second guide groove 506 are omitted for the sake of simplicity.

FIG. 13 shows a cassette holder 550 of the conventional magnetic recording and reproduction apparatus 600. Part (a) of FIG. 13 is a left side view of the cassette holder 550, part (b) is a plan view thereof, part (c) is a right side view thereof, and part (d) is a front view thereof.

The cassette holder 550 includes an insertion opening 552 through which a cassette can be inserted, and a lock lever 554 for locking the cassette holder 550 to the sub chassis 500.

The lock lever 554 and the lock engaging section 502 shown in FIG. 12 are included in a locking section.

In FIGS. 11, 12 and 13, a mechanism for pulling out a tape from the cassette and winding the tape around the rotatable head cylinder 402, a mechanism for driving the tape and the like are omitted.

FIGS. 14 and 15 are each a schematic view of a cassette holder elevating section 560 of the conventional magnetic recording and reproduction apparatus 600. The cassette holder elevating section 560 moves the cassette holder 550 upward and downward with respect to the sub chassis 500. FIG. 14 shows a state where the cassette holder 550 has been moved up with respect to the sub chassis 500 by the cassette holder elevating section 560. FIG. 15 shows a state where the cassette holder 550 has been moved down with respect to the sub chassis 500 by the cassette holder elevating section 560.

The cassette holder elevating section 560 includes a first link 562, a second link 564, and a spring 566.

FIGS. 14 and 15 show a left side section 500a of the sub chassis 500 shown in FIG. 12. The side section 500a has a cam groove 500b therein. FIG. 12 shows only a bottom section of the sub chassis 500 and does not show the left side section 500a.

A left side section of the cassette holder 550 has a cam groove 550a provided therein.

As shown in FIGS. 14 and 15, the first link 562 has a first end 562a and a second end 562b. The first end 562a is slidably engaged with the cam groove 500b, and the second end 562b is pivotably engaged with the left side section of the cassette holder 550.

The second link 564 has a first end 564a and a second end 564b. The first end 564a is slidably engaged with the cam groove 550a of the cassette holder 550, and the second end 564b is pivotably engaged with the left side section 500a of the sub chassis 500.

The first link 562 and the second link 564 are pivotably engaged with each other at an engaging point 564c.

The spring. 566 is extended between the first link 562 and the second link 564. One end of the spring 566 is connected to the second end 562b of the first link 562, and the other end of the spring 566 is connected to the first end 564a of the second link 564. The spring 566 applies a force so as to reduce the distance between the second end 562b of the first link 562 and the first end 564a of the second link 564. This increases the distance between the sub chassis 500 and the cassette holder 550, and thus the cassette holder 550 moves upward with respect to the sub chassis 500.

In the above, the cassette holder elevating section 560 provided on a left side section of the magnetic recording and reproduction apparatus 600 is described with reference to FIGS. 14 and 15. On a right side section of the magnetic recording and reproduction apparatus 600, a mechanism similar to the cassette holder elevating section 560 is provided.

In general, a synchronization shaft is provided for synchronizing the first links provided on the left side section and the right side section and also synchronizing the second links provided on the left side section and the right side section. FIGS. 14 and 15 omit the synchronization shaft.

The cassette (not shown) is insertable at the state shown in FIG. 14 where the cassette holder 550 has been moved up. When the cassette holder 550 is pushed down from this state, the state shown in FIG. 15 is realized.

When the cassette holder 550 is pushed down onto the sub chassis 500, the lock lever 554 (FIG. 13) is engaged with the lock engaging section 502 (FIG. 12). This fixes the cassette holder 550 and the sub chassis 500 to each other to some extent. FIGS. 14 and 15 omit the lock lever 554 and the lock engaging section 502.

In general, the look lever 554 is pivotably provided to the cassette holder 550. A detailed mechanism for engaging the lock lever 554 with the lock engaging section 502 and releasing the lock lever 554 from the lock engaging section 502 is omitted from FIGS. 11 through 15. The lock section including the lock lever 554 and the lock engaging section 502 is provided only on the right side section of the magnetic recording and reproduction apparatus 600.

FIG. 16 shows the magnetic recording and reproduction apparatus 600 at a cassette mountable position. Part (a) of FIG. 16 is a left side view of the magnetic recording and reproduction apparatus 600, and part (b) is a plan view thereof.

FIG. 17 shows the magnetic recording and reproduction apparatus 600 at a tape pull-out position. Part (a) of FIG. 17 is a left side view of the magnetic recording and reproduction apparatus 600, and part (b) is a plan view thereof.

FIGS. 16 and 17 omit the cassette holder elevating sections, the mechanism for pulling out the tape from the cassette and winding the tape around the rotatable head cylinder 402, the mechanism for driving the tape and the like.

As shown in FIGS. 16 and 17, the first projection guide section 404 and the second projection guide section 406 provided on the main chassis 400 are respectively movably engaged with the first guide groove 504 and the second guide groove 506 provided in the sub chassis 500. Thus, the sub chassis 500 is reciprocally movably guided relative to the main chassis 400. In FIG. 16, the cassette holder 550 has been moved down with respect to the sub chassis 500. The sub chassis 500 is movable relative to the main chassis 400 from the cassette mountable position shown in FIG. 16 to the tape pull-out position shown in FIG. 17.

The magnetic recording and reproduction apparatus 600 has the following problems. The force at which the cassette holder 550 moves upward by the spring 566 is suppressed by the lock lever 554 and the lock engaging section 502. However, since the locking section including the lock lever 554 and the lock engaging section 502 is provided on the right side section of the magnetic recording and reproduction apparatus 600, the cassette holder 550 tries to move upward with respect to the sub chassis 500 and the main chassis 400 on the left side section of the magnetic recording and reproduction apparatus 600. As a result, the left side of the cassette holder 550 goes upward from the horizontal state of the cassette holder 550. Thus, the position of the cassette in the height direction is not determined with respect to the sub chassis 500 and the main chassis 400.

In order to solve this problem, it is conceivable to set the cassette 550 such that the left side of the cassette 550 is slightly lower than the right side thereof in the state where the cassette holder 550 has been moved up. This is made possible by offsetting the phase between the first link provided on the left side section and the first link provided on the right side section of the cassette holder elevating section and also offsetting the phase between the second link provided on the left side section and the second link provided on the right side section of the cassette holder elevating section. However, this causes another problem that the cassette holder 550 is tilted at the position where the cassette holder 550 has been moved up.

When the phase between the first links provided on the left side section and the right side section of the cassette holder elevating section and the phase between the second links provided on the left side section and the right side section of the cassette holder elevating section are offset as described above, the cassette holder 550 presses the sub chassis 500 downward in a state where the cassette holder 550 has been moved down by the variance in the phases. This force twists the sub chassis 500 and the main chassis 400. As a result, the tilt precision of the tape guide posts for guiding the tape in the recording and reproduction state of the magnetic recording and reproduction apparatus 600 is deteriorated, thus spoiling the stable running of the tape.

SUMMARY OF THE INVENTION

A magnetic recording and reproduction apparatus, for recording information to, and/or reproducing information from, a magnetic tape accommodated in a cassette, includes a main chassis on which a rotatable head cylinder for recording information to, and/or reproducing information from, the magnetic tape is mounted; a sub chassis movable relative to the main chassis; a cassette holder for holding the cassette and mounting the cassette on the sub chassis; a cassette holder elevating section for moving the cassette holder up and down with respect to the sub chassis; a holder engaging section provided on the main chassis; and a main chassis engaging section provided on the cassette holder. The sub chassis is movable relative to the main chassis from a cassette mountable position at which the cassette is mountable on the sub chassis to a tape pull-out position at which the magnetic tape has been pulled out from the cassette and wound around the rotatable head cylinder. The holder engaging section and the main chassis engaging section are engaged with each other at the tape pull-out position.

Thus, a magnetic recording and reproduction apparatus is provided for holding the cassette holder with respect to the sub chassis and the main chassis with high precision with certainty and by a simple structure while protecting the sub chassis and the main chassis by a reaction force of the spring for moving up the cassette holder.

In one embodiment of the invention, the magnetic recording and reproduction apparatus further includes a guide section for including a projection guide section provided on the main chassis and a guide groove provided in the sub chassis, the guide section guiding the sub chassis relative to the main chassis by the projection guide section and the guide groove being engaged with each other; and the holder engaging section and the main chassis engaging section are engaged with each other in the state where at least one of the main chassis engaging section and the holder engaging section is inserted through the guide groove.

Thus, a magnetic recording and reproduction apparatus is provided for holding the cassette holder with respect to the sub chassis and the main chassis with high precision with certainty by a simple structure without requiring a large space while protecting the sub chassis and the main chassis by a reaction force of the spring for moving up the cassette holder.

In one embodiment of the invention, the magnetic recording and reproduction apparatus further includes a holder locking section for engaging the cassette holder and the sub chassis. The holder locking section is provided on a side of the magnetic recording and reproduction apparatus which is opposite, with respect to the center of the magnetic recording and reproduction apparatus, to the side where the holder engaging section and the main chassis engaging section are provided.

Thus, a high precision magnetic recording and reproduction apparatus is provided for protecting the sub chassis and the main chassis from being twisted by a reaction force of the spring for moving up the cassette holder, even when the mechanism for locking the cassette holder to the sub chassis at one side of the magnetic recording and reproduction apparatus. Such a magnetic recording and reproduction apparatus is realized by providing a mechanism for engaging the cassette holder and the main chassis.

As described above, in a magnetic recording and reproduction apparatus, the holder engaging section and the main chassis engaging section are engaged with each other at the tape-pull out position of the magnetic recording and reproduction apparatus.

Owing to such a structure, the present invention provides a magnetic recording and reproduction apparatus in which the cassette holder can be held with respect to the main chassis with high precision with certainty and by a simple structure.

Thus, the invention described herein makes possible the advantages of providing a magnetic recording and reproduction apparatus for holding a cassette holder with respect to the main chassis with high precision with certainty and by a simple structure at the tape pull-out position.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described byway of illustrative examples with reference to the attached drawings.

A magnetic recording and reproduction apparatus 300 in one example according to the present invention will be described with reference to FIGS. 1 through 10.

The magnetic recording and reproduction apparatus 300 for recording information to, and/or reproducing information from a magnetic tape accommodated in a cassette includes two chassis, i.e., a main chassis and a sub chassis.

Figure 1:
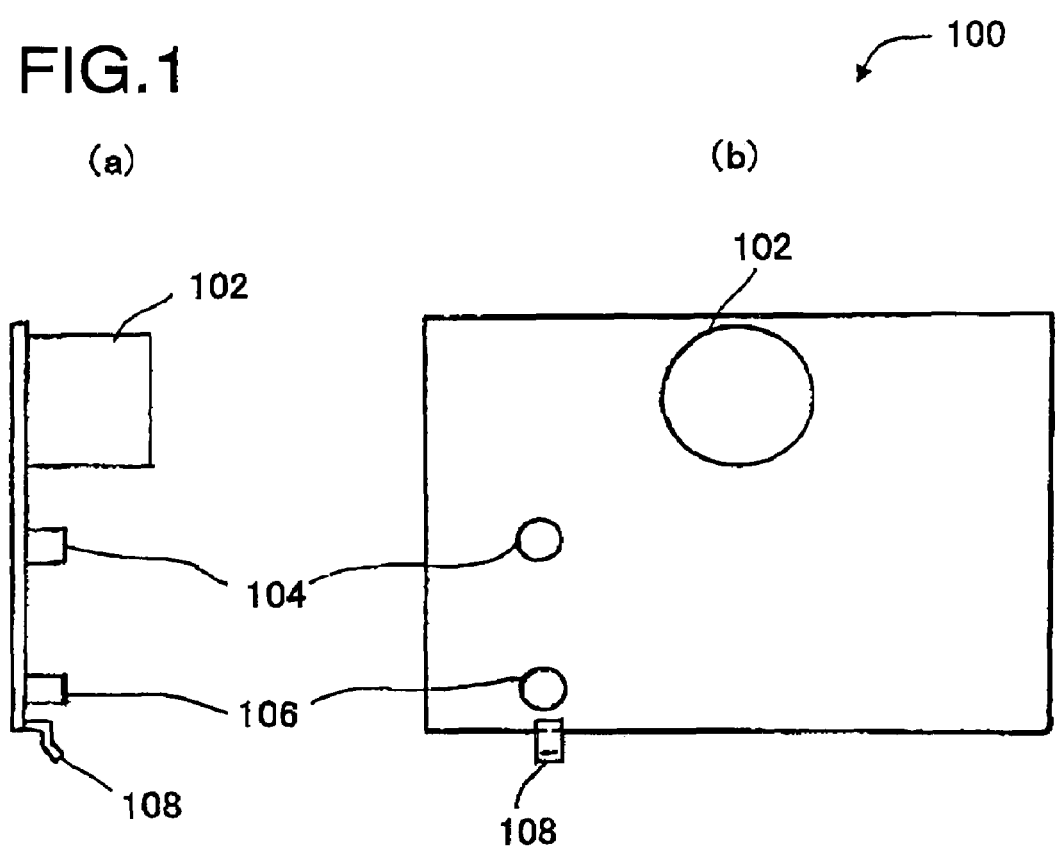
FIG. 1 shows a left side view and a plan view of a main chassis of a magnetic recording and reproduction apparatus in one example according to the present invention.

FIG. 1 shows a main chassis 100 of the magnetic recording and reproduction apparatus 300. Part (a) of FIG. 1 is a left side view of the main chassis 100, and part (b) of FIG. 1 is a plan view thereof.

The following elements are provided on the main chassis 100: a rotatable head cylinder 102 for recording information to, and/or reproducing information from, a magnetic tape, a first projection guide section 104 projecting upward from the main chassis 100, a second projection guide section 106 projecting upward from the main chassis 100, and a holder engaging section 108.

In FIG. 1, the elements other than the rotatable head cylinder 102, the first projection guide section 104, the second projection guide section 106, and the holder engaging section 108 are omitted for the sake of simplicity.

Figure 2:
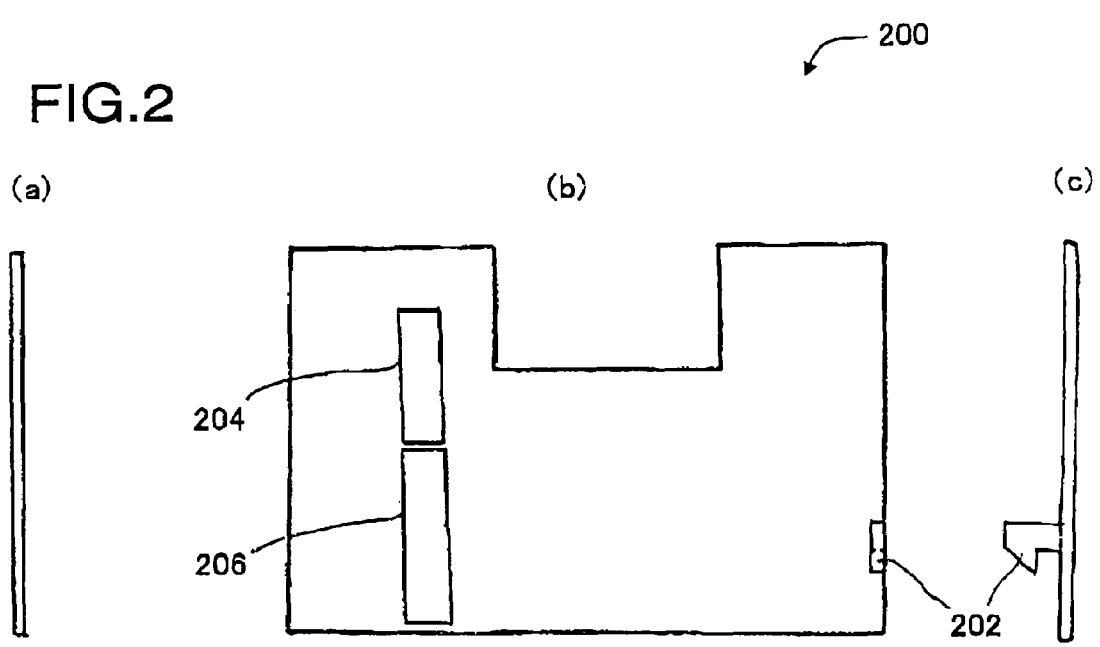
FIG. 2 shows a left side view, a plan view, and a right side view of a sub chassis of the magnetic recording and reproduction apparatus in one example according to the present invention.

FIG. 2 shows a sub chassis 200 of the magnetic recording and reproduction apparatus 300. Part (a) of FIG. 2 is a left side view of the sub chassis 200, part (b) is a plan view thereof, and part (c) is a right side view thereof.

The following elements are provided on the sub chassis 200: a lock engaging section 202, a first guide groove 204, and a second guide groove 206. The lock engaging section 202 is provided at a right end of the sub chassis 200.

In FIG. 2, the elements other than the lock engaging section 202, the first guide groove 204, and the second guide groove 206 are omitted for the sake of simplicity.

Figure 3:
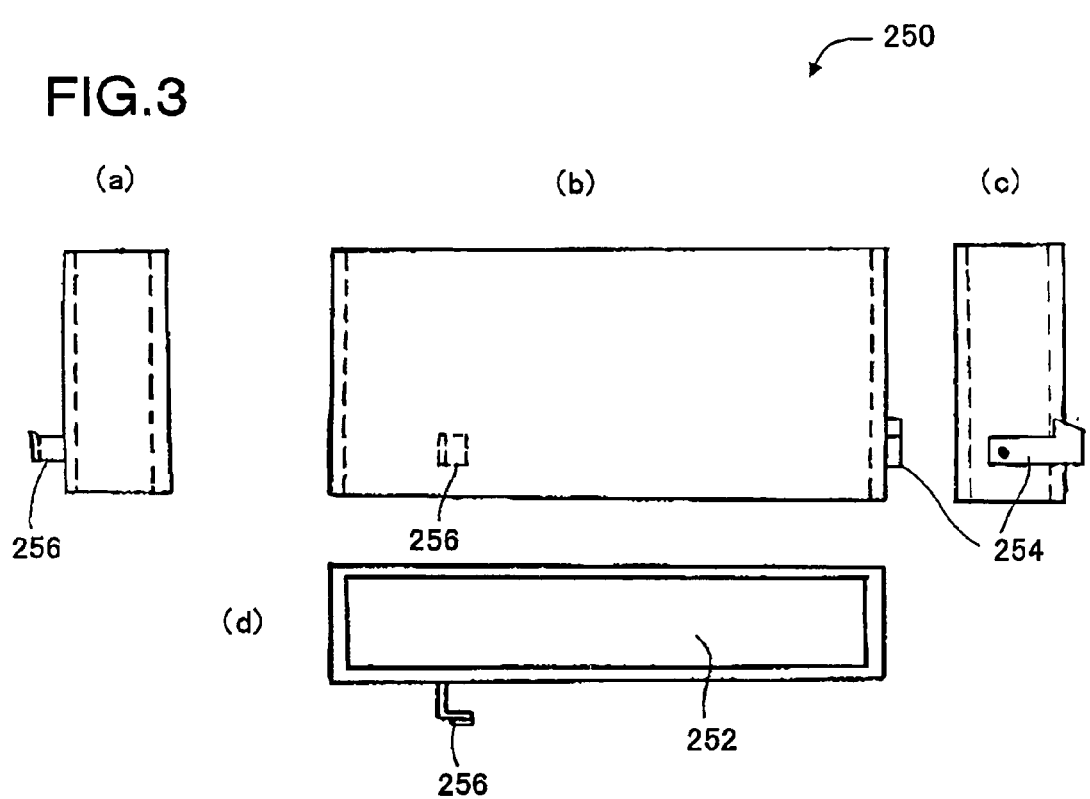
FIG. 3 shows a left side view, a plan view, a right side view, and a front view of the magnetic recording and reproduction apparatus in one example according to the present invention.

FIG. 3 shows a cassette holder 250 of the magnetic recording and reproduction apparatus 300. Part (a) of FIG. 3 is a left side view of the cassette holder 250, part (b) is a plan view thereof, part (c) is a right side view thereof, and part (d) is a front view thereof.

The cassette holder 250 can hold a cassette 39 (FIG. 10) and thus can mount the cassette 39 on the sub chassis 200.

The cassette holder 250 includes an insertion opening 252 through which the cassette 39 can be inserted, a lock lever 254 for locking the cassette holder 250 to the sub chassis 200, and a main chassis engaging section 256.

The lock lever 254 and the lock engaging section 202 shown in FIG. 2 are included in a locking section.

The main chassis engaging section 256 is provided on a bottom surface of the cassette holder 250.

In FIGS. 1, 2 and 3, a mechanism for pulling out a magnetic tape 40 (FIG. 10) from the cassette 39 and winding the tape 40 round the rotatable head cylinder 102, a mechanism for driving the tape and the like are omitted.

Figure 4:
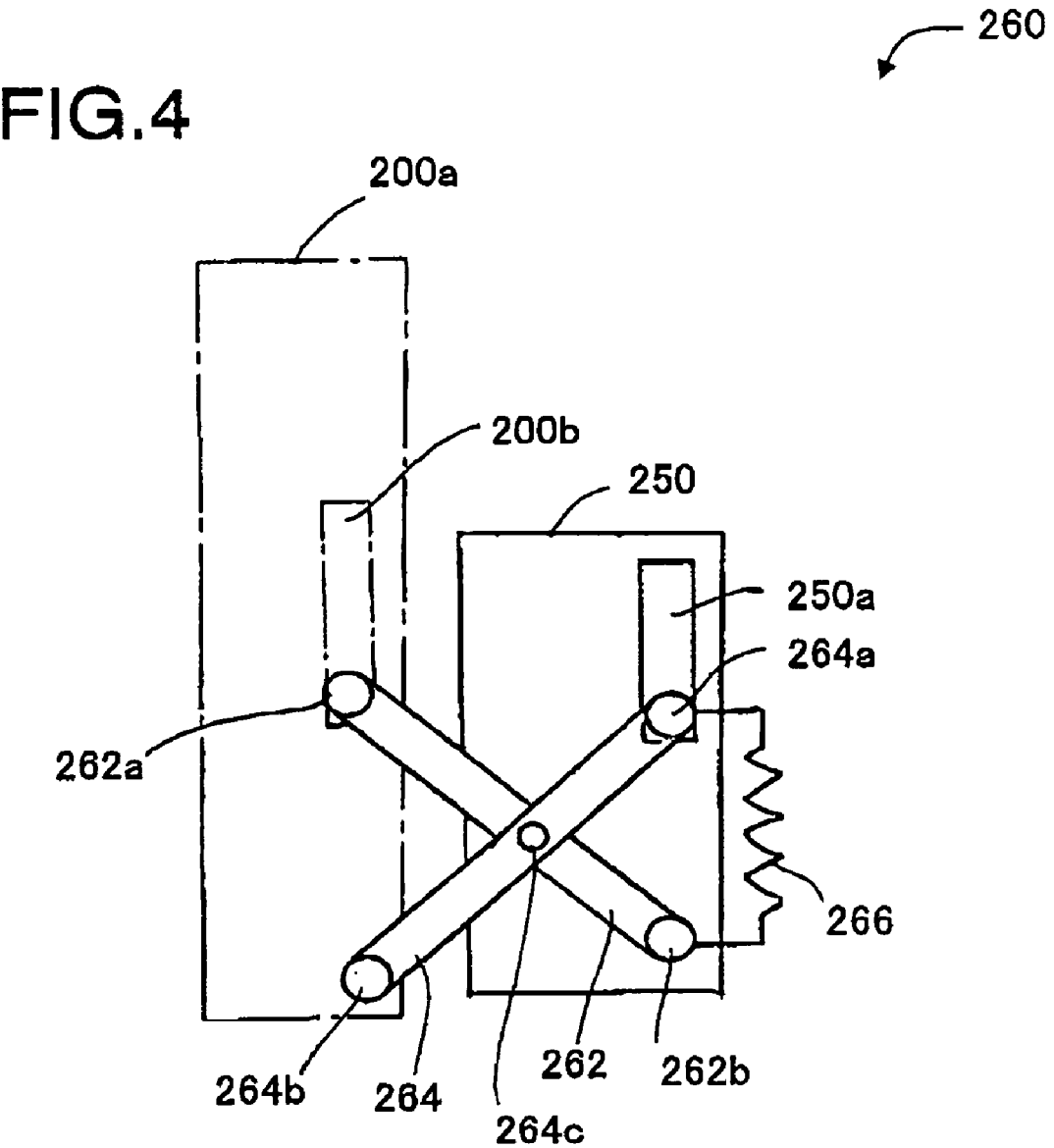
FIG. 4 is a schematic view of a cassette holder elevating section in the state where a cassette holder has been moved up in the magnetic recording and reproduction apparatus in one example according to the present invention.
Figure 5:
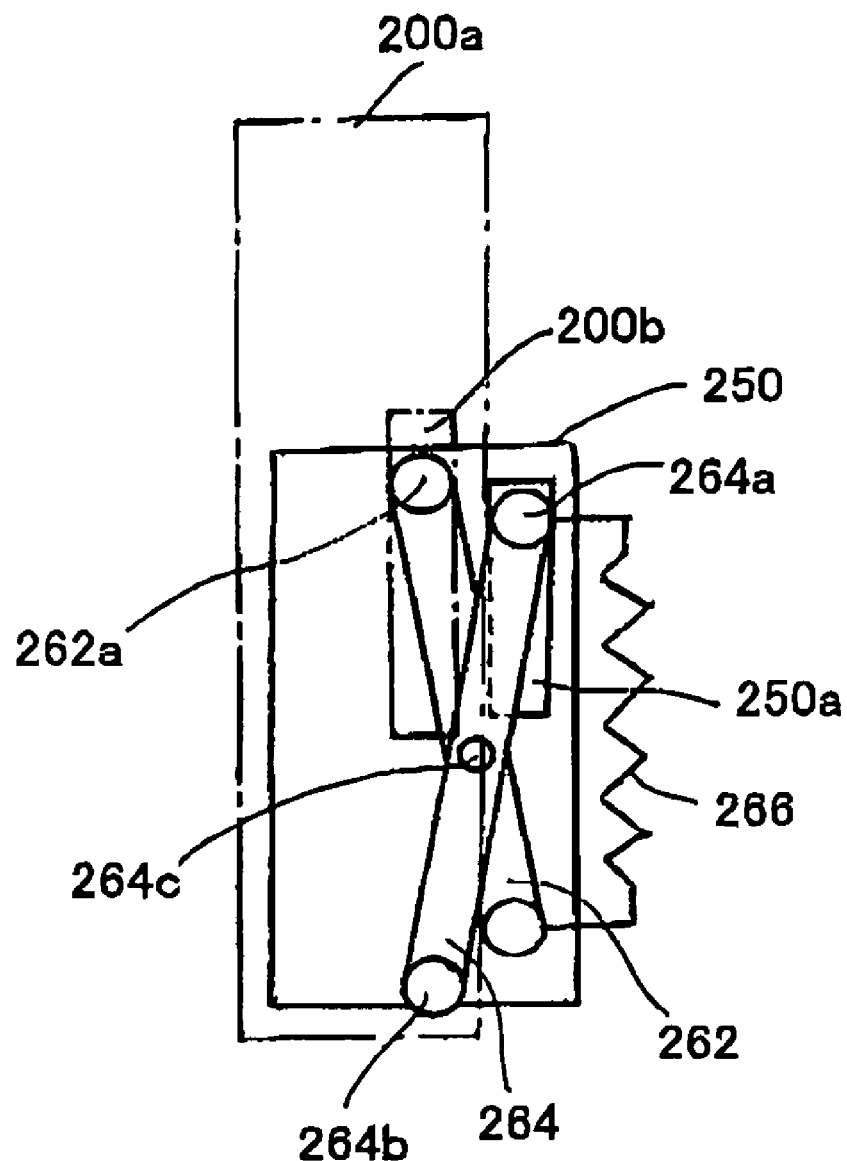
FIG. 5 is a schematic view of the cassette holder elevating section in the state where the cassette holder has been moved down in the magnetic recording and reproduction apparatus in one example according to the present invention.

FIGS. 4 and 5 are each a schematic view of a cassette holder elevating section 260 of the magnetic recording and reproduction apparatus 300. The cassette holder elevating section 260 moves the cassette holder 250 upward and downward with respect to the sub chassis 200. FIG. 4 shows a state where the cassette holder 250 has been moved up with respect to the sub chassis 200 by the cassette holder elevating section 260. FIG. 5 shows a state where the cassette holder 250 has been moved down with respect to the sub chassis 200 by the cassette holder elevating section 260.

A left side section of the cassette holder 250 has a cam groove 250a provided therein.

FIGS. 4 and 5 show a left side section 200a of the sub chassis 200 shown in FIG. 2. The side section 200a has a cam groove 200b therein. FIG. 2 shows only a bottom section of the sub chassis 200 and does not show the left side section 200a.

As shown in FIGS. 4 and 5, the cassette holder elevating section 260 includes a first link 262, a second link 264, and a spring 266.

The first link 262 has a first end 262a and a second end 262b. The first end 262a is slidably engaged with the cam groove 200b, and the second end 262b is pivotally engaged with the left side section of the cassette holder 250.

The second link 264 has a first end 264a and a second end 264b. The first end 264a is slidably engaged with a cam groove 250a of the cassette holder 250, and the second end 264b is pivotally engaged with the left side section 200a of the sub chassis 200.

The first link 262 and the second link 264 are pivotally engaged with each other at an engaging point 264c.

The spring 266 is extended between the first link 262 and the second link 264. One end of the spring 266 is connected to the second end 262b of the first link 262, and the other end of the spring 266 is connected to the first end 264a of the second link 264. The spring 266 applies a force so as to reduce the distance between the second end 262b of the first link 262 and the first end 264a of the second link 264. This increases the distance between the sub chassis 200 and the cassette holder 250, and thus the cassette holder 250 moves upward with respect to the sub chassis 200.

In the above, the cassette holder elevating section 260 provided on a left side section of the magnetic recording and reproduction apparatus 300 is described with reference to FIGS. 4 and 5. On a right side section of the magnetic recording and reproduction apparatus 300, a mechanism similar to the cassette holder elevating section 260 is provided.

In general, a synchronization shaft is provided for synchronizing the first links provided on the left side section and the right side section and also synchronizing the second links provided on the left side section and the right side section. FIGS. 4 and 5 omit the synchronization shaft.

The cassette (not shown) is insertable at the state shown in FIG. 4 where the cassette holder 250 has been moved up. When the cassette holder 250 is pushed down from this state, the state shown in FIG. 5 is realized.

When the cassette holder 250 is pushed down onto the sub chassis 200, the lock lever 254 (FIG. 3) is engaged with the lock engaging section 202 (FIG. 2). This fixes the cassette holder 250 and the sub chassis 200 to each other to some extent. FIGS. 4 and 5 omit the lock lever 254 and the lock engaging section 202.

In general, the lock lever 254 is pivotally provided to the cassette holder 250. A detailed mechanism for engaging the lock lever 254 with the lock engaging section 202 and releasing the lock lever 254 from the lock engaging section 202 is omitted from FIGS. 1 through 5. The lock section including the lock lever 254 and the lock engaging section 202 is provided only on the right side section of the magnetic recording and reproduction apparatus 300.

Figure 6:
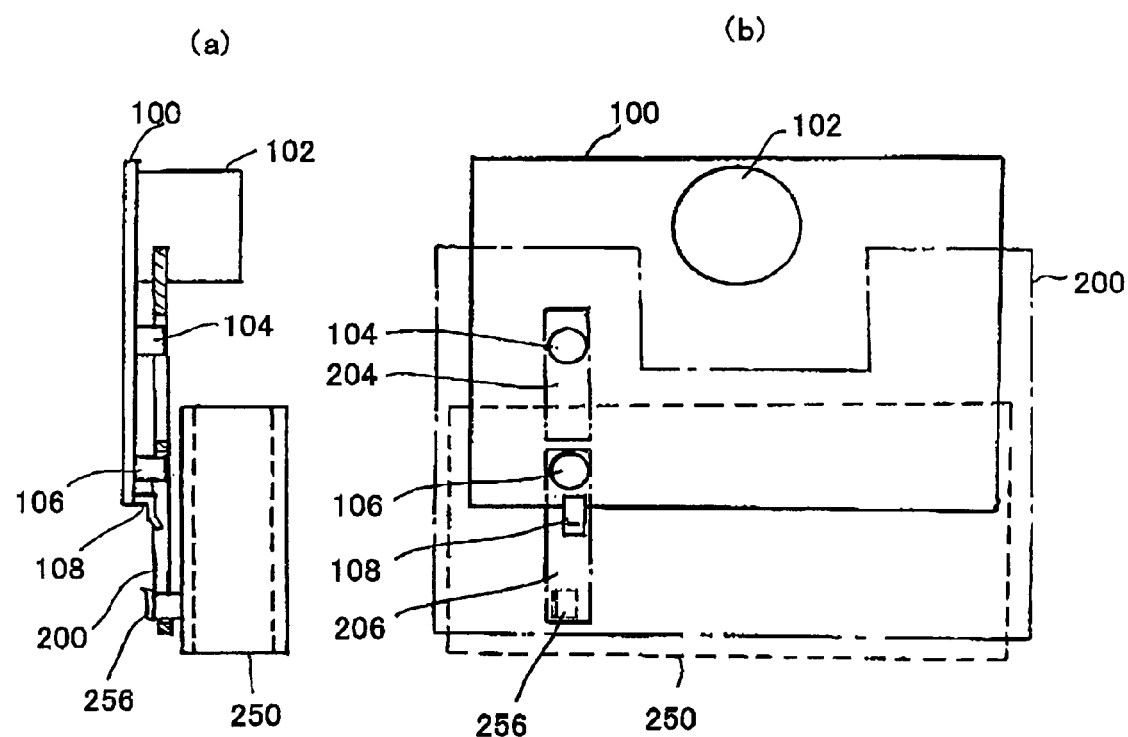
FIG. 6 shows a left side view and a plan view of the magnetic recording and reproduction apparatus at a cassette mountable position of the magnetic recording and reproduction apparatus in one example according to the present invention.

FIG. 6 shows the magnetic recording and reproduction apparatus 300 at a cassette mountable position. Part (a) of FIG. 6 is a left side view of the magnetic recording and reproduction apparatus 300, and part (b) is a plan view thereof.

The cassette mountable position is a position of the magnetic recording and reproduction apparatus 300 where the cassette (not shown) is inserted into the cassette holder 250 so that the cassette holder 250 holds the cassette and the cassette is mounted on the sub chassis 200 in that state.

Figure 7:
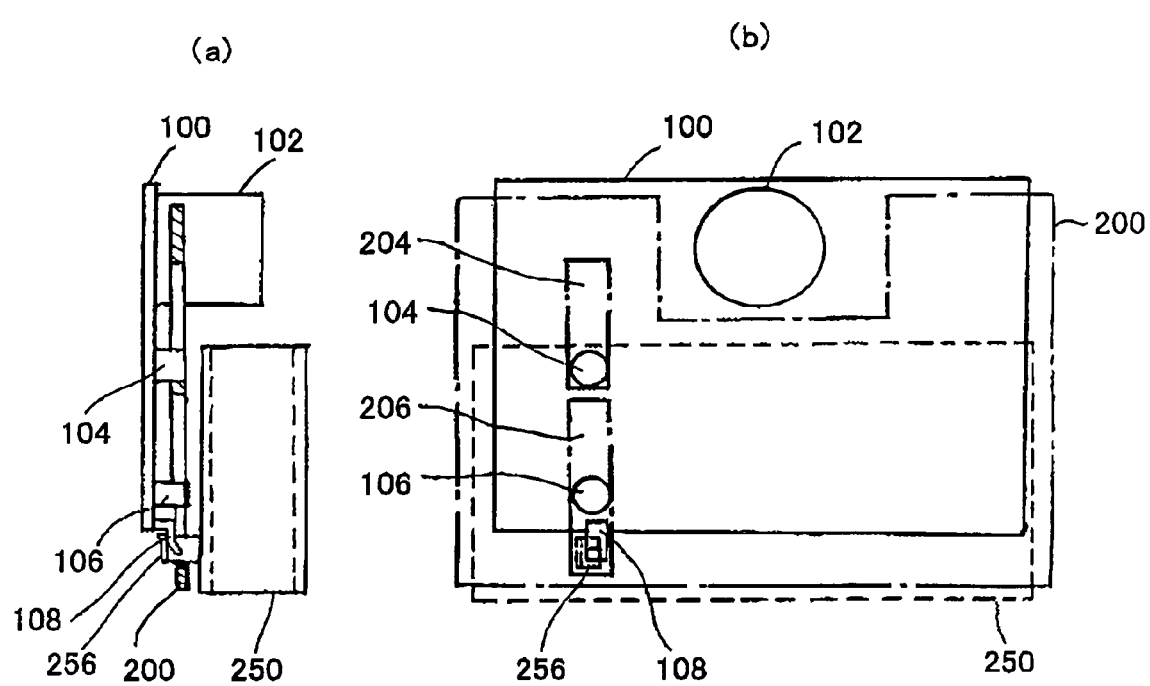
FIG. 7 shows a left side view and a plan view of the magnetic recording and reproduction apparatus at a tape pull-out position of the magnetic recording and reproduction apparatus in one example according to the present invention.

FIG. 7 shows the magnetic recording and reproduction apparatus 300 at a tape pull-out position. Part (a) of FIG. 7 is a left side view of the magnetic recording and reproduction apparatus 300, and part (b) is a plan view thereof.

The tape pull-out position is a position of the magnetic recording and reproduction apparatus 300 where the magnetic tape has been pulled out from the cassette and wound around the rotatable head cylinder 102.

FIGS. 6 and 7 omit the cassette holder elevating sections, the mechanism for pulling out the tape from the cassette and winding the tape around the rotatable head cylinder 102, the mechanism for driving the tape and the like.

As shown in FIGS. 6 and 7, the first projection guide section 104 and the second projection guide section 106 provided on the main chassis 100 are respectively movably engaged with the first guide groove 204 and the second guide groove 206 provided in the sub chassis 200. Thus, the sub chassis 200 is reciprocally movably guided relative to the main chassis 100.

In FIG. 6, the cassette holder 250 has been moved down with respect to the sub chassis 200. At the cassette mountable position shown in FIG. 6, the main chassis engaging section 256 provided on the bottom surface of the cassette holder 250 passes through the second guide groove 206 of the sub chassis 200. The holder engaging section 108 provided on the main chassis 100 is in the same plane as the second guide groove 206 of the sub chassis 200.

The sub chassis 200 is movable relative to the main chassis 100 from the cassette mountable position shown in FIG. 6 to the tape pull-out position shown in FIG. 7.

As shown in FIG. 7, the main chassis engaging section 256 is provided in the vicinity of the second projection guide section 106 when the magnetic recording and reproduction apparatus 300 is at the tape pull-out position.

When the magnetic recording and reproduction apparatus 300 is at the tape pull-out position, as shown in FIG. 7, the main chassis engaging section 256 is engaged with the holder engaging section 108 to fix the position of the cassette holder 250 in the up-and-down direction with respect to the main chassis 100. Thus, the main chassis 100 and the sub chassis 200 are protected against being twisted by the reaction force of the spring 266 for moving the cassette holder 250 upward.

Hereinafter, the main chassis 100 will be described in detail.

Figure 8:
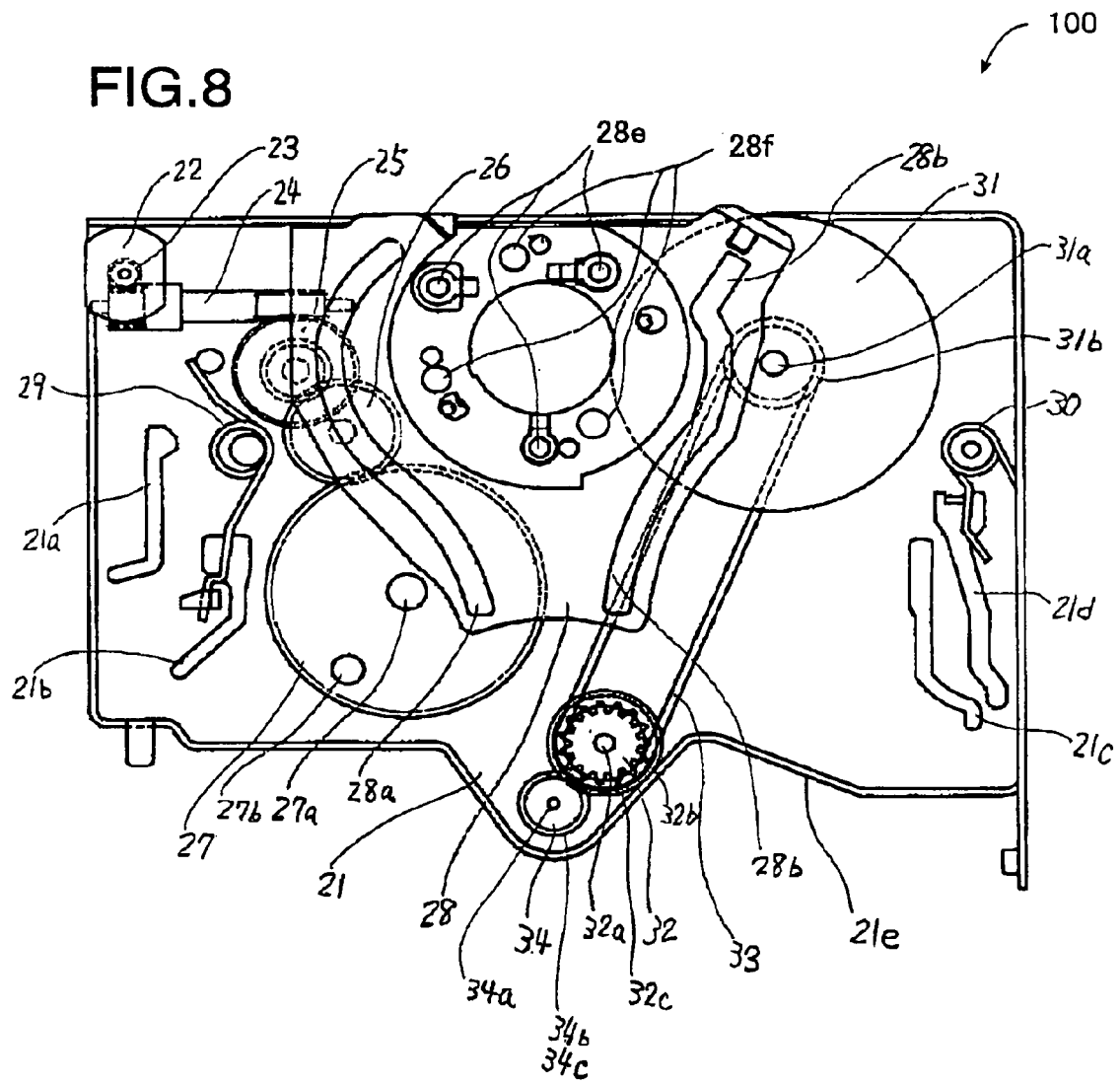
FIG. 8 is a plan view of the main chassis of the magnetic recording and reproduction apparatus in one example according to the present invention.

FIG. 8 is a plan view of the main chassis 100.

The main chassis 100 has, for example, the following elements provided thereon: a capstan 31, a capstan shaft 31a provided on the capstan 31, a drive gear 32, a timing belt 33, and a center gear 34.

Figure 10:
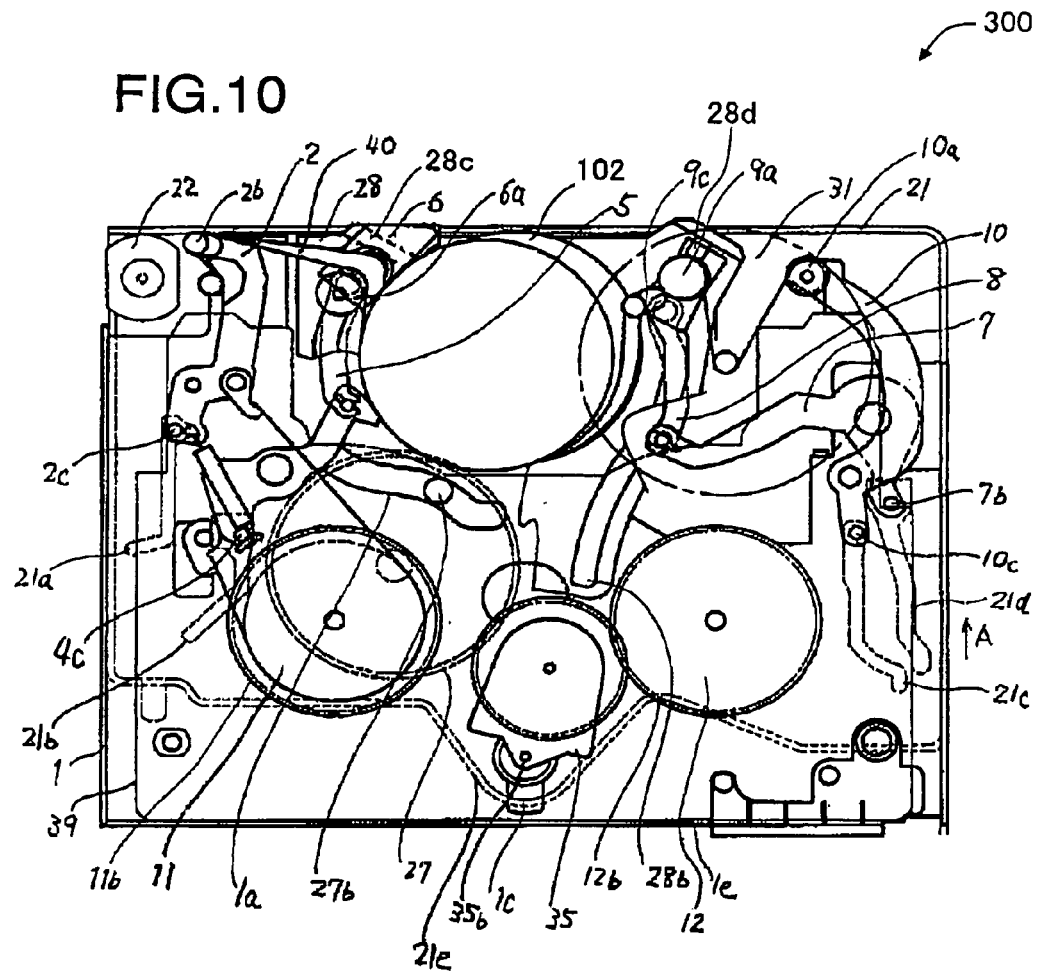
FIG. 10 is a plan view of the magnetic recording and reproduction apparatus at the tape pull-out position in one example according to the present invention.
Figure 11:
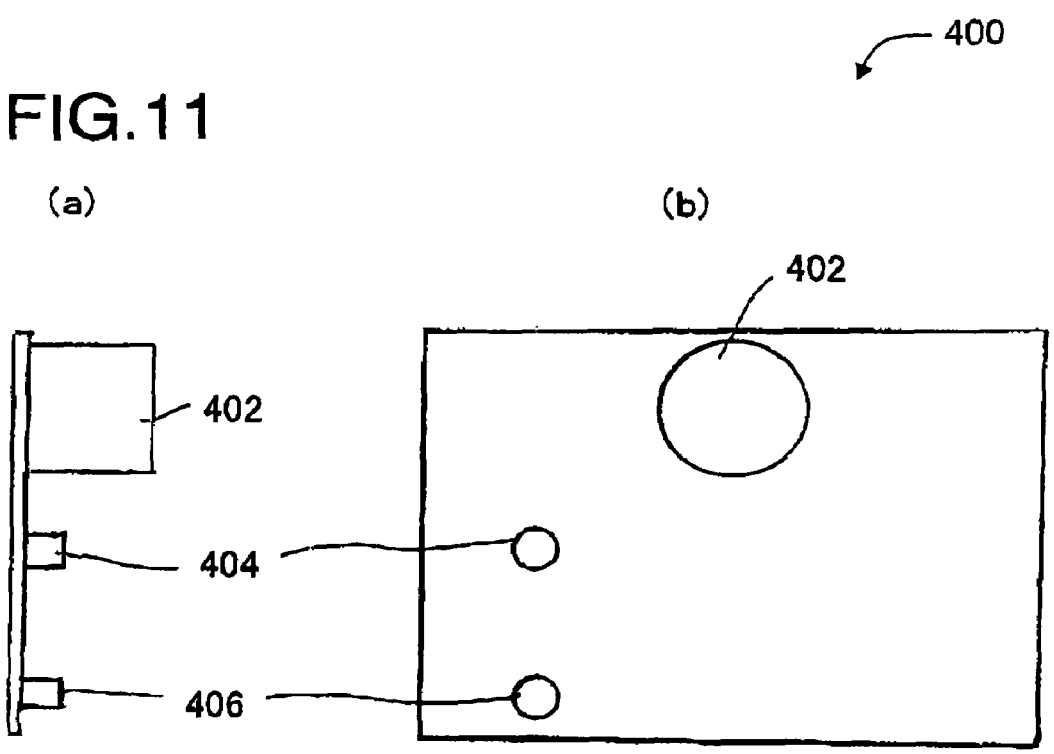
FIG. 11 shows a left side view and a plan view of a main chassis of a conventional magnetic recording and reproduction apparatus.
Figure 12:
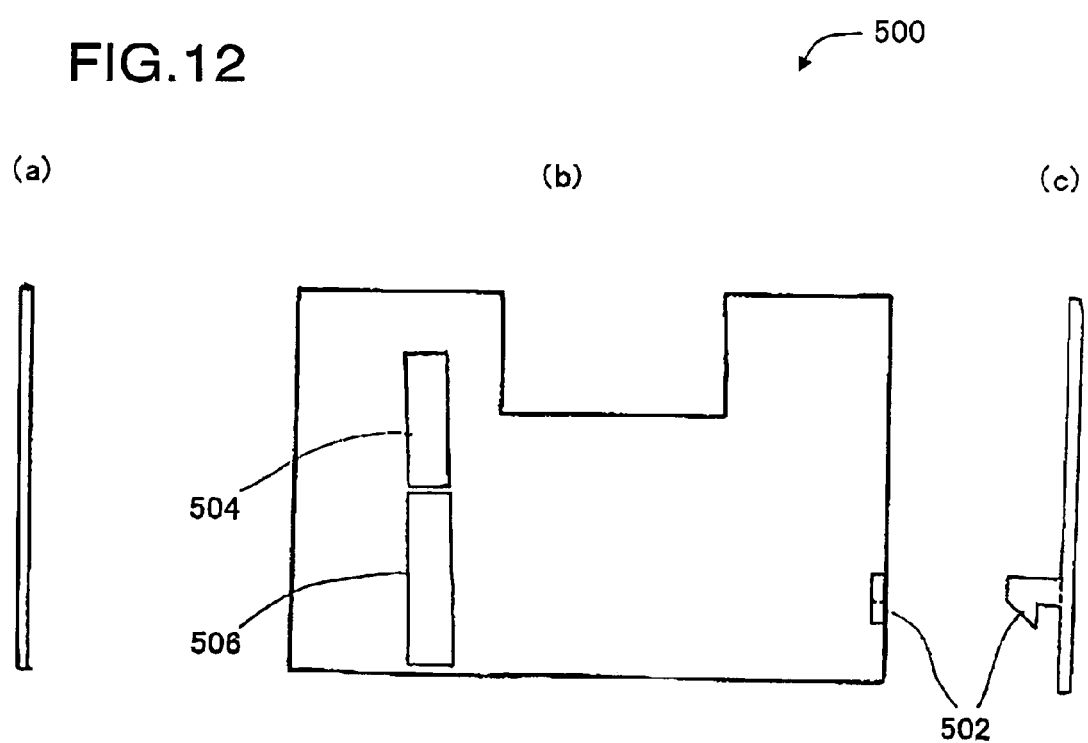
FIG. 12 shows a left side view, a plan view, and a right side view of a sub chassis of the conventional magnetic recording and reproduction apparatus.
Figure 13:
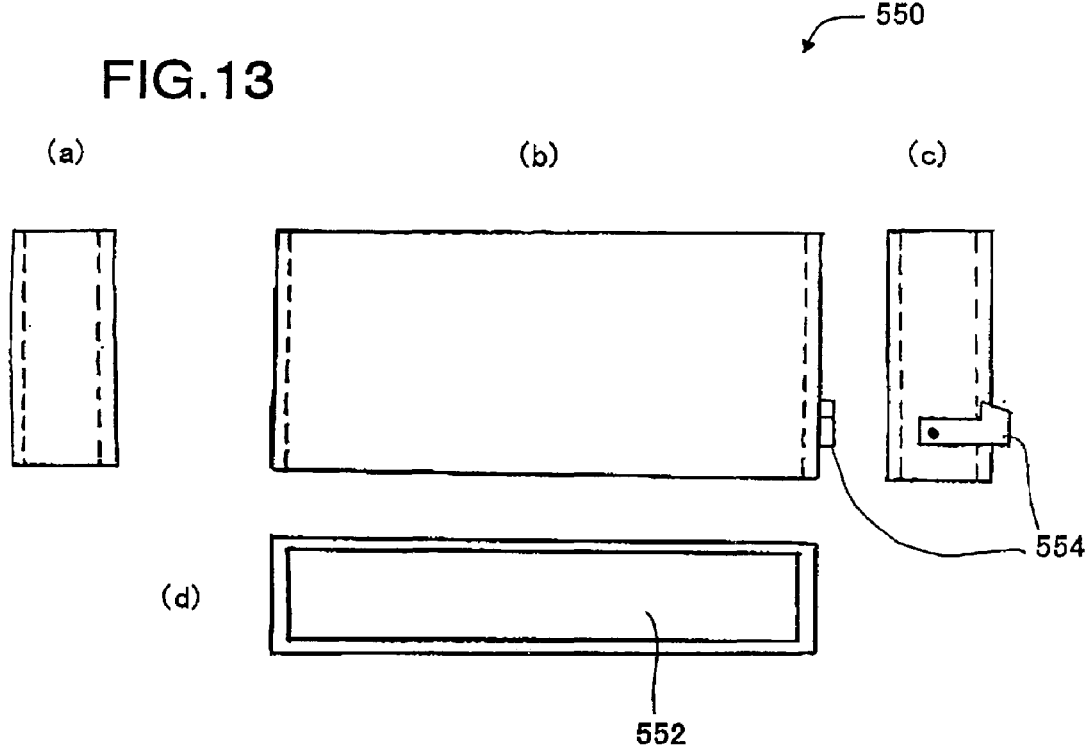
FIG. 13 shows a left side view, a plan view, a right side view, and a front view of a cassette holder of the conventional magnetic recording and reproduction apparatus.
Figure 14:
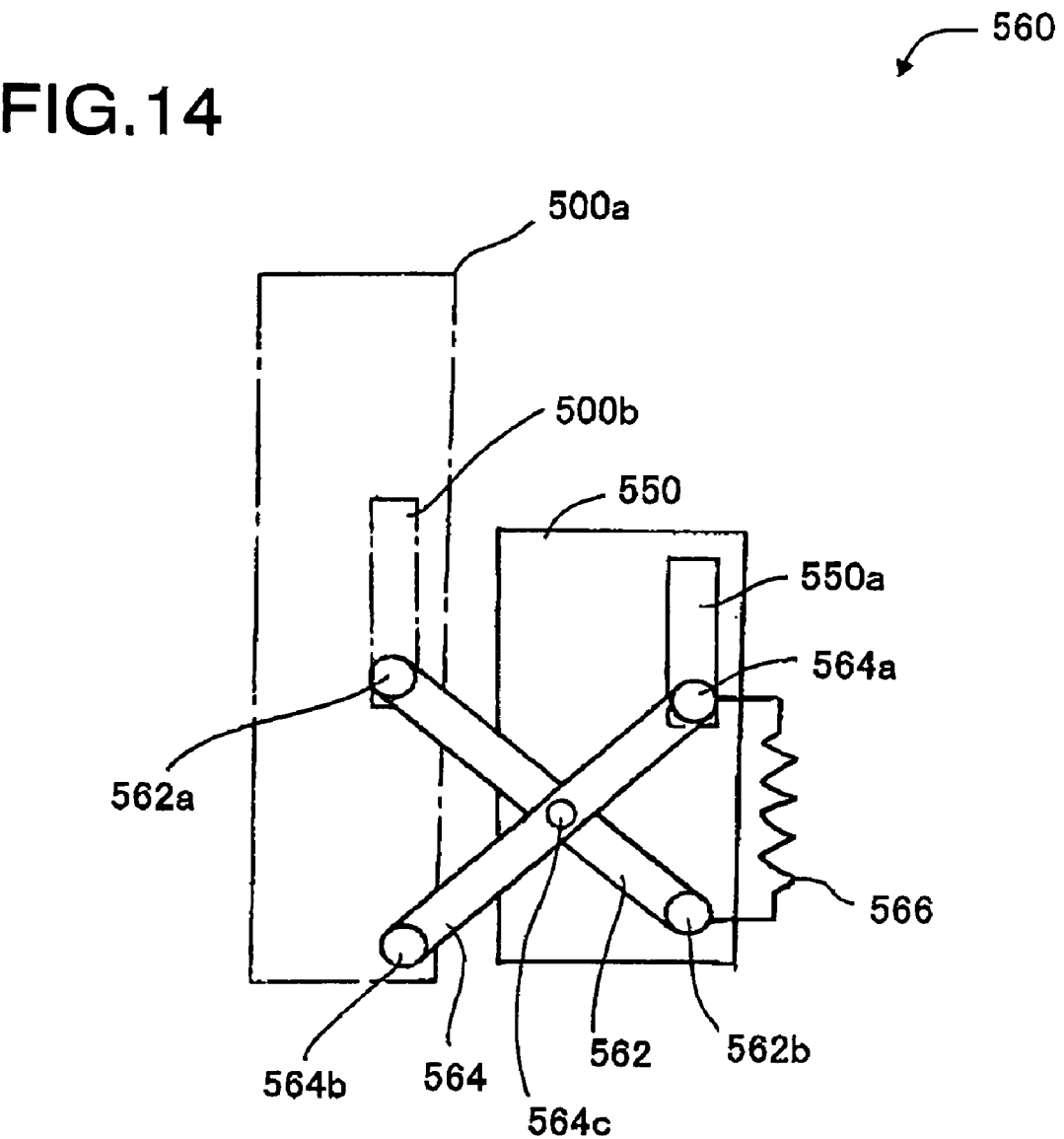
FIG. 14 is a schematic view of a cassette holder elevating section of the conventional magnetic recording and reproduction apparatus in the state where the cassette holder has been moved up.
Figure 15:
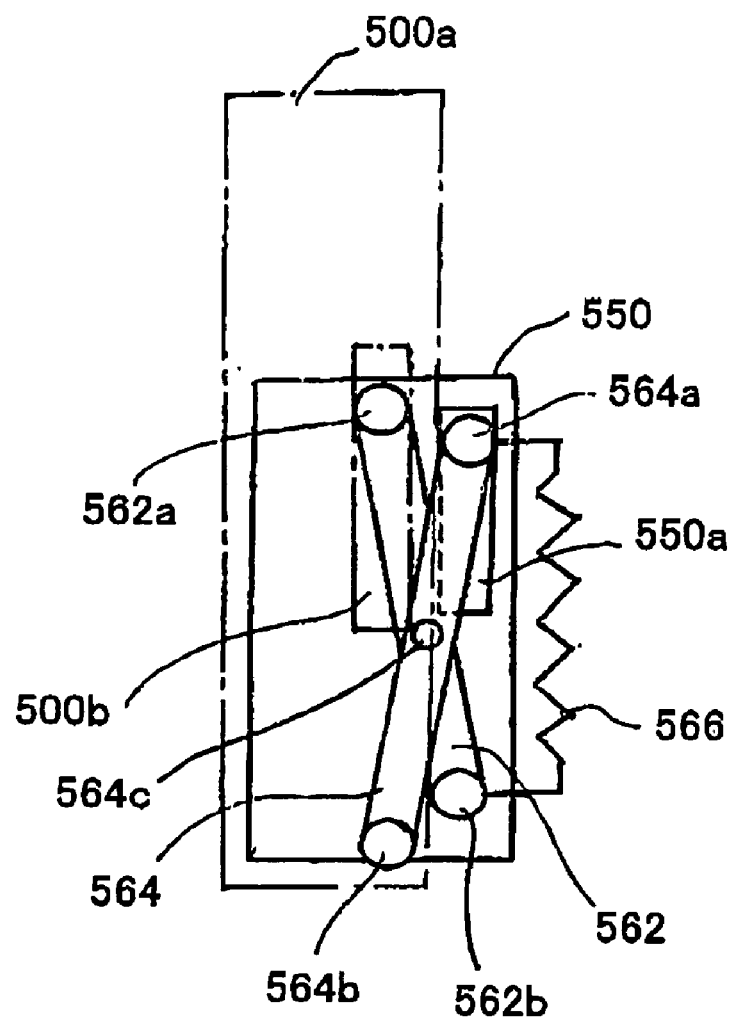
FIG. 15 is a schematic view of the cassette holder elevating section of the conventional magnetic recording and reproduction apparatus in the state where the cassette holder has been moved down.
Figure 16:
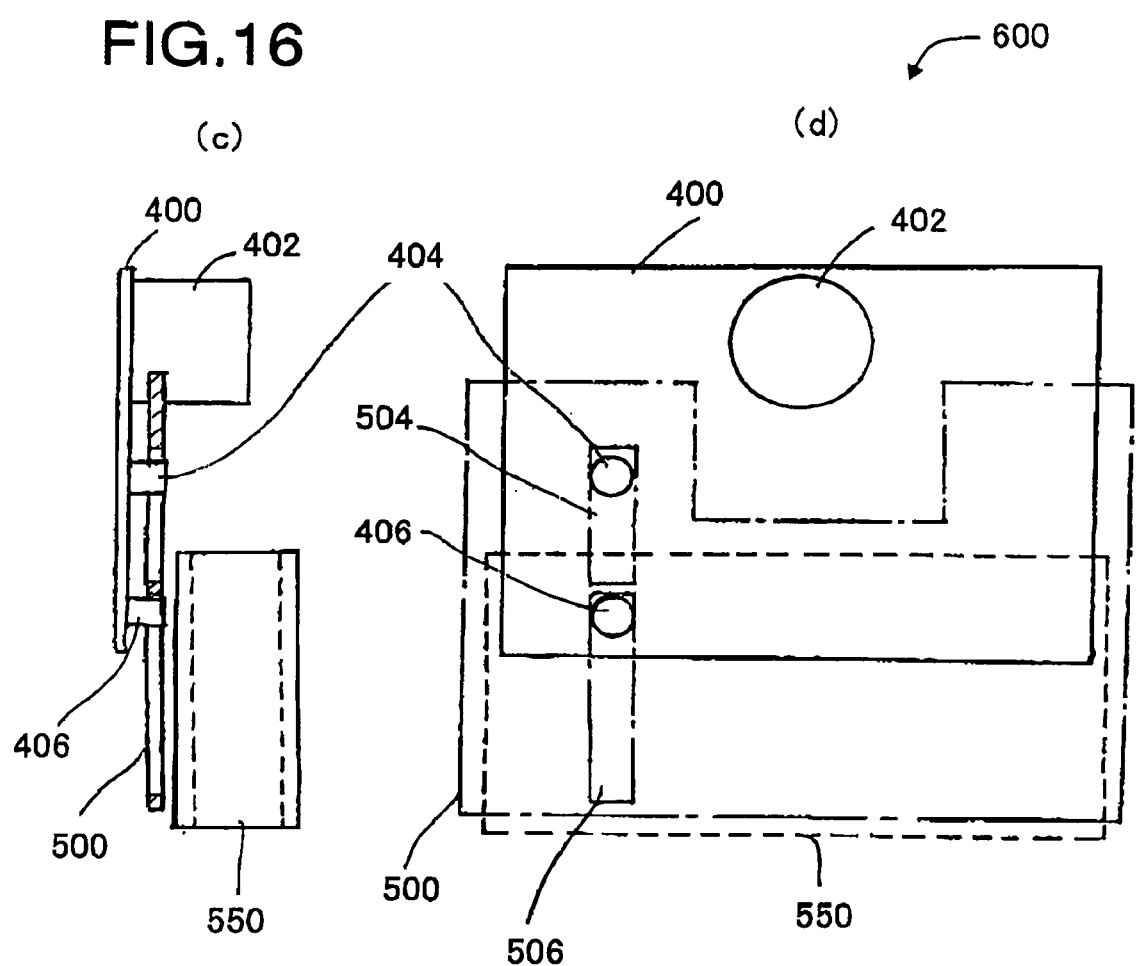
FIG. 16 shows a left side view and a plan view of the conventional magnetic recording and reproduction apparatus at the cassette mountable position.
Figure 17:
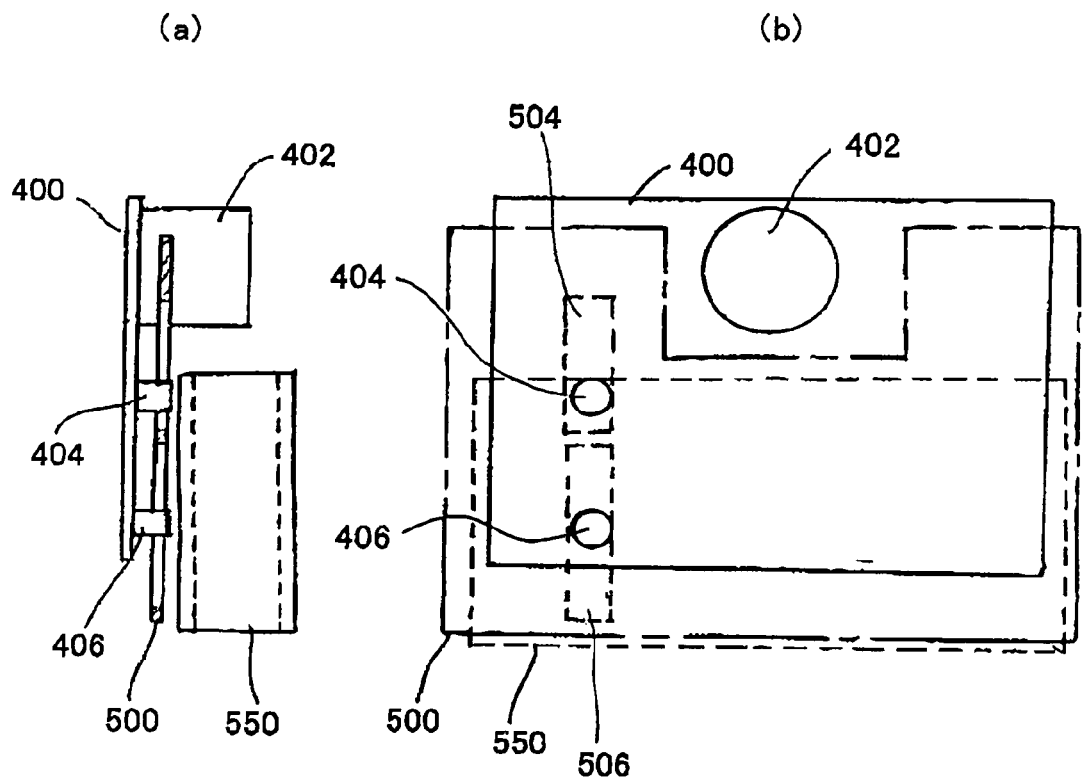
FIG. 17 shows a left side view and a plan view of the conventional magnetic recording and reproduction apparatus at the tape pull-out position.

The main chassis 100 has four cam grooves 21a, 21b, 21c and 21d formed therein. A portion of the main chassis 100 along a forward end 21e is largely cut out on both sides of the drive gear 32 and the center gear 34 toward the rotatable head cylinder 102 (FIG. 10). The forward end 21e has an L-shaped cross-section in the thickness direction of the magnetic recording and reproduction apparatus 300. The forward end 21e has a certain thickness.

A motor 22 is rotatable forward and backward. A rotation force of the motor 22 is conveyed to a mode gear 27 via a motor worm 23, a connection worm 24, and gears 25 and 26.

The mode gear 27 is rotatable with a support 27a as the center of rotation. A sub chassis driving pin 27b is provided on a top surface of the mode gear 27. The sub chassis driving pin 27b is engaged with the sub chassis 200 (FIG. 2), so that the sub chassis 200 is movable relative to the main chassis 100.

A cylinder base 28 is secured to the main chassis 100 via three cylinder screw holes 28e. The rotatable head cylinder 102 (FIG. 10) is provided on a cylinder base 28, and is secured with three cylinder screw holes 28f which are screwed from a rear surface of the cylinder base 28.

Guide grooves 28a and 28b are respectively provided for guiding the S boat 6 and the T boat 9 mounted on the sub chassis 200 when the S boat 6 and the T boat 9 (FIG. 9) pull out the magnetic tape from the cassette 39.

Elastic twisted coil springs 29 and 30 are secured on the main chassis 100 in the state of being provided with a pressure by a prescribed force.

The capstan shaft 31a rotates in the state where the pinch roller (not shown) presses the tape to the capstan shaft 31a, thereby driving the tape. A capstan gear 31b is integrally provided with the capstan 31.

The drive gear 32 is supported at an axis thereof by a rotation shaft 32a provided on the main chassis 100. The drive gear 32 includes an upper gear 32b and a lower gear 32c. The timing belt 33 is extended around the upper gear 32b and the capstan gear 31b integral with the capstan 31.

The center gear 34 is supported at an axis thereof by a rotation shaft 34a provided on the main chassis 100. The center gear 34 includes an upper gear 34b and a lower gear 34c. The lower gear 32c of the drive gear 32 and the lower gear 34a of the center gear 34 are engaged with each other.

Next, the sub chassis 200 will be described in detail.

Figure 9:
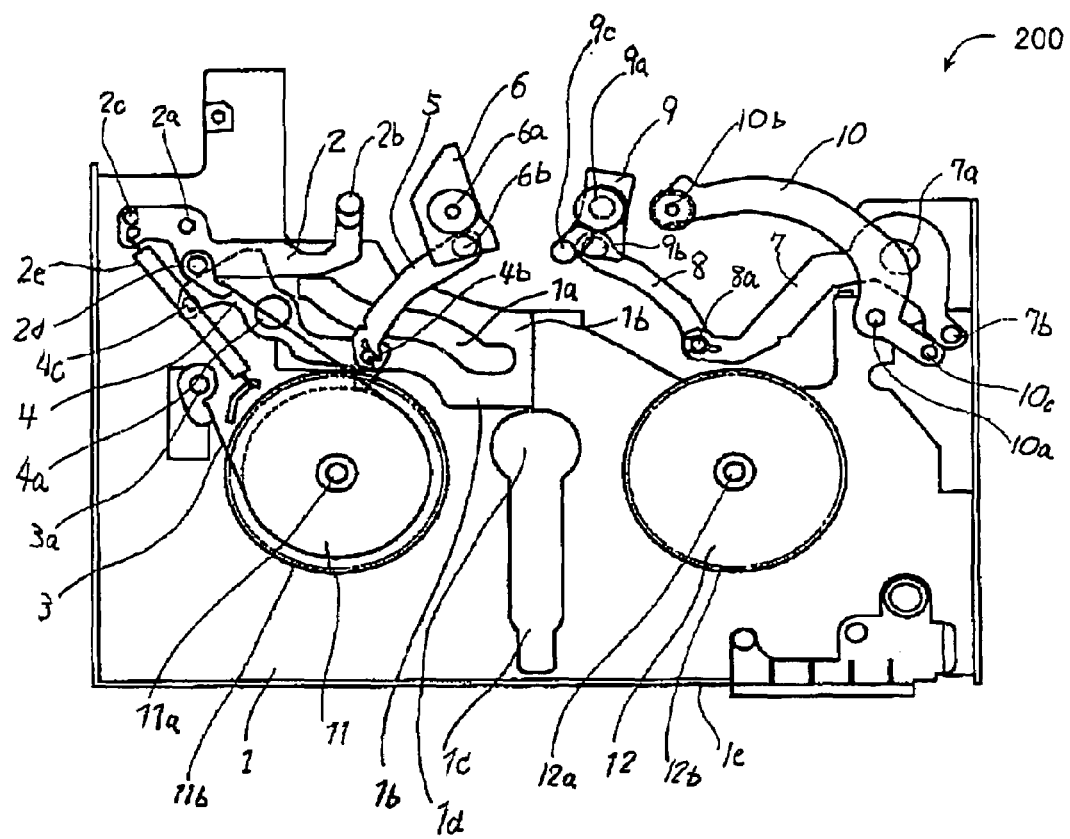
FIG. 9 is a plan view of the sub chassis of the magnetic recording and reproduction apparatus in one example according to the present invention.

FIG. 9 is a plan view of the sub chassis 200.

The sub chassis 200 has, for example, the following provided thereon: four tape pull-out members 2, 6, 9 and 10, a supply reel stand (hereinafter, referred to also as an "S reel stand") 11 rotatably supported on the sub chassis 200, and a take-in reel stand (hereinafter, referred to also as a "T reel stand") 12 rotatably supported on the sub chassis 200. The four tape pull-out members 2, 6, 9 and 10 will also be referred to as a TR arm 2, an S boat 6, a T boat 9, and a T3 arm 10.

The cassette 39 (FIG. 10) is mountable on the sub chassis 200. The cassette 39 is mounted from a forward end 1e of the sub chassis 200. The cassette 39 has a general structure including a magnetic tape, a supply reel, a take-in reel, and a reel lock member for locking the supply reel and the take-in reel.

The S reel stand 11 is engageable with the supply reel of the cassette, and the T reel stand 12 is engageable with the take-in reel of the cassette.

The TR arm 2 is pivotably supported about a support 2a on the sub chassis 200. A TR post 2b is provided on a top surface of one end of the TR arm 2, and a TR arm driving pin 2c is provided on a bottom surface of the other end of the TR arm 2.

The T3 arm 10 is pivotably supported about a support 10a on the sub chassis 200. A T3 post 10b is provided on a top surface of one end of the T3 arm 10, and a T3 arm driving pin 10c is provided on a bottom surface of the other end of the T3 arm 10.

An S arm 4 is pivotably supported about a support 4a on the sub chassis 200. An S arm driving pin 4c is provided on a bottom surface of one end of the S arm 4, and an S link pin 4b is provided on a top surface of the other end of the S arm 4.

An S link 5 is pivotably attached to the S link pin 4b at one end of the S link 5. The S boat 6 is pivotably attached to the other end of the S link 5 via a boss 6b.

A T arm 7 has substantially the same structure as that of the S arm 4. Specifically, the T arm 7 is supported to be pivotable about a support 7a on the sub chassis 200. A T arm driving pin 7b is provided on a bottom surface of one end of the T arm 7, and a T link pin 8a is provided on a top surface of the other end of the T arm 7.

A T link 8 is pivotably attached to the T link pin 8a at one end of the T link 8. The T boat 9 is pivotably attached to the other end of the T link 8 via a boss 9b.

The S boat 6 has an S roller post 6a provided thereon for guiding the magnetic tape, and the T boat 9 has a T roller post 9a and a T1 post 9c provided thereon for guiding the magnetic tape.

As described above, all the tape pull-out members 2, 6, 9 and 10 are provided on the sub chassis 200.

The S reel stand 11 and the T reel stand 12 are supported so as to be rotatable about a shaft 11a and a shaft 12a, respectively. A gear portion 11b is provided around an outer circumference of the S reel stand 11, and a gear portion 12b is provided around an outer circumference of the T reel stand 12. The S reel stand 11 is engaged with a supply reel of the cassette 39 (FIG. 10) and the T reel stand 12 is engaged with a take-in reel of the cassette 39 when the cassette is mounted on the sub chassis 200. This engagement allows the magnetic tape to be taken in.

A brake band (TR band) 3 for controlling the tension of the magnetic tape while the magnetic tape is running is wound around the S reel stand 11. One end of the TR band 3 is supported about a pivotable member 2d of the TR arm 2, and the other end of the TR band 3 is supported about a pivotable member 3a on the sub chassis 200. While the magnetic tape is running, a load acts on the S reel stand 11 via the TR band 3 by a force of a TR spring 2e attached to the TR arm 2.

In a sub chassis adjusting plate 1b, a groove 1a is formed. The sub chassis adjusting plate 1b is secured to the sub chassis 200 by a screw (not shown). The sub chassis 200 has a lengthy hole 1c and a circular hole 1d communicated with the lengthy hole 1c at an end of the lengthy hole 1c opposite to the forward end 1e.

FIG. 10 is a plan view of the magnetic recording and reproduction apparatus 300 at the tape pull-out position.

The magnetic recording and reproduction apparatus 300 includes the sub chassis 200 on which the cassette 39 is mountable and the main chassis 100 having the rotatable head cylinder 102 mounted thereon.

The sub chassis 200 accommodates the supply reel stand 11 and the take-in reel stand 12 respectively engageable with the supply reel and the take-in reel in the cassette 39. The main chassis 100 accommodates the capstan 31 for driving the magnetic tape 40.

The idler 35 is supported by the main chassis 100 at an axis thereof, and is driven by the rotation of the capstan shaft 31a. The idler 35 is engaged with the supply reel stand 11 and the take-in reel stand 12 to rotate the supply reel stand 11 and the take-in reel stand 12.

At the tape pull-out position, the tape pull-out members 2, 6, 9 and 10 pull out the magnetic tape 40 from the cassette 39 accommodating the supply reel and the take-in reel, and winds the magnetic tape 40 around the rotatable head cylinder 102 over a prescribed angle. Thus, at least one of information recording to, and information reproduction from, the magnetic tape 40 is performed.

The main chassis 100, the sub chassis 200, and the magnetic recording and reproduction apparatus 300 described in detail with reference to FIGS. 8, 9 and 10 merely represents one example of the present invention. The present invention is not limited to the structure shown in FIGS. 8, 9 and 10.

In FIGS. 8, 9 and 10, the projection guide sections, the guide grooves, the holder engaging section, the main chassis engaging section, and the cassette holder are not shown for the sake of simplicity.

As described above, according to the present invention, the holder engaging section 108 is provided on the main chassis 100, and the main chassis engaging section 256 is provided on the cassette holder 250. At the tape pull-out position of the magnetic recording and reproduction apparatus 300, the main chassis engaging section 256 and the holder engaging section 108 are engaged with each other in the state where the main chassis engaging section 256 is inserted through the second guide groove 206 of the sub chassis 200. The holder engaging section 108 and the main chassis engaging section 256 are provided at the side opposite to the side where the lock lever 254 and the lock engaging section 202 are provided. Therefore, in the magnetic recording and reproduction apparatus 300 according to the present invention, the cassette holder 250 can be held with respect to the sub chassis 200 and the main chassis 100 with high precision with certainty and by a simple structure without requiring a large space, and the main chassis 100 and the sub chassis 200 are protected against being twisted by the reaction force of the spring for moving the cassette holder 250 upward.

In the above example, the locking section of the cassette holder 250 is provided on the right side section of the magnetic recording and reproduction apparatus 300, and the holder engaging section 108 and the main chassis engaging section 256 are provided on the left side section of the magnetic recording and reproduction apparatus 300. Alternatively, the locking section of the cassette holder 250 may be provided on the left side section of the magnetic recording and reproduction apparatus 300, and the holder engaging section 108 and the main chassis engaging section 256 may be provided on the right side section of the magnetic recording and reproduction apparatus 300.

In the above example, the main chassis engaging section 256 and the holder engaging section 108 are engaged with each other in the state where the main chassis engaging section 256 is inserted through the second guide groove 206 of the sub chassis 200. The present invention is not limited to such a structure. The main chassis engaging section 256 and the holder engaging section 108 may be engaged with each other in the state where at least one of the main chassis engaging section 256 and the holder engaging section 108 is inserted through the guide groove. Alternatively, an opening may be provided in the sub chassis 200 other than the guide groove, and the main chassis engaging section 256 and the holder engaging section 108 may be engaged with each other in the opening. The main chassis engaging section 256 and the holder engaging section 108 may be engaged with each other without providing an opening in the sub chassis 200.

In the above example, one holder engaging section 108 and one main chassis engaging section 256 are provided. The present invention is not limited to such a structure. A plurality of holder engaging sections and a plurality of main chassis engaging sections may be provided.

In the above example, the holder engaging section 108 and the main chassis engaging section 256 are respectively provided on a bottom section of the main chassis 100 and a bottom section of the cassette holder 250. Alternatively, the holder engaging section 108 and the main chassis engaging section 256 may be provided on a side section of the main chassis 100 and a side section of the cassette holder 250.

According to the present invention, as described above, the holder engaging section and the main chassis engaging section are engaged with each other when the magnetic recording and reproduction apparatus is at the tape pull-out position. Thus, the magnetic recording and reproduction apparatus can hold the cassette holder with respect to the main chassis with high precision with certainty and by a simple structure without requiring an excessively large space.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus for recording information to, and/or reproducing information from, a magnetic tape accommodated in a cassette, the magnetic recording and reproduction apparatus comprising:
   a main chassis on which a rotatable head cylinder for recording information to, and/or reproducing information from, the magnetic tape is mounted;
   a sub chassis movable relative to the main chassis;
   a cassette holder for holding the cassette and mounting the cassette on the sub chassis;
   a cassette holder elevating section for moving the cassette holder up and down with respect to the sub chassis;
   a holder engaging section provided on the main chassis; and
   a main chassis engaging section provided on the cassette holder; and
   a guide section for including a projection guide section provided on the main chassis and a guide groove provided in the sub chassis, the guide section guiding the sub chassis relative to the main chassis by the projection guide section and the guide groove being engaged with each other;
   wherein:
   the sub chassis is movable relative to the main chassis from a cassette mountable position at which the cassette is mountable on the sub chassis to a tape pull-out position at which the magnetic tape has been pulled out from the cassette and wound around the rotatable head cylinder;

the holder engaging section and the main chassis engaging section are engaged with each other at the tape pull-out position, and the holder engaging section and the main chassis engaging section are engaged with each other in the state where at least one of the main chassis engaging section and the holder engaging section is inserted through the guide groove.

2. A magnetic recording and reproduction apparatus according to claim 1, further comprising a holder locking section for engaging the cassette holder and the sub chassis, wherein the holder locking section is provided on a side of the magnetic recording and reproduction apparatus which is opposite, with respect to the center of the magnetic recording and reproduction apparatus, to the side where the holder engaging section and the main chassis engaging section are provided.

* * * * *